US012732312B2

(12) United States Patent
Elazzouni et al.

(10) Patent No.: US 12,732,312 B2
(45) Date of Patent: Sep. 8, 2026

(54) POLLING IMPROVEMENTS FOR RADIO LINK CONTROL

(71) Applicant: QUALCOMM Incorporated, San Diego, CA (US)

(72) Inventors: Sherif Elazzouni, San Diego, CA (US); Sitaramanjaneyulu Kanamarlapudi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 44 days.

(21) Appl. No.: 18/440,142

(22) Filed: Feb. 13, 2024

(65) Prior Publication Data

US 2025/0260516 A1 Aug. 14, 2025

(51) Int. Cl.

*H04L 1/1829* (2023.01)
*H04L 1/18* (2023.01)
*H04L 5/00* (2006.01)
*H04W 72/566* (2023.01)

(52) U.S. Cl.

CPC .............. *H04L 1/1858* (2013.01); *H04L 1/18* (2013.01); *H04L 5/0044* (2013.01); *H04L 5/0055* (2013.01); *H04W 72/566* (2023.01)

(58) Field of Classification Search

CPC ....... H04L 1/18; H04L 5/0044; H04L 5/0055; H04L 1/1858; H04W 72/566

See application file for complete search history.

(56) References Cited

U.S. PATENT DOCUMENTS

| | | | | |
|---|---|---|---|---|
| 11,546,874 | B1 * | 1/2023 | Martin | H04W 64/003 |
| 2004/0100964 | A1 * | 5/2004 | Robotham | H04L 1/1858 370/394 |
| 2005/0201354 | A1 * | 9/2005 | Hosaka | H04L 1/1887 370/349 |
| 2010/0223492 | A1 * | 9/2010 | Farrugia | H04L 65/1104 714/E11.023 |

(Continued)

FOREIGN PATENT DOCUMENTS

| | | | |
|---|---|---|---|
| EP | 1777859 | B1 | 1/2019 |
| WO | WO-2021057185 | A1 * | 4/2021 |
| WO | WO-2022016489 | A1 | 1/2022 |

OTHER PUBLICATIONS

International Search Report and Written Opinion—PCT/US2025/012821—ISA/EPO—Apr. 9, 2025.

*Primary Examiner* — Steve N Nguyen
(74) *Attorney, Agent, or Firm* — Holland & Hart LLP

(57) ABSTRACT

Methods, systems, and devices for wireless communications are described. A user equipment (UE) may receive a configuration message indicating a threshold time duration event associated with transmission of a polling message for requesting a status protocol data unit (PDU). The threshold time duration event may correspond to a time period following transmission of a data message without reception of the status PDU. The UE may transmit a first data message. After a time duration has elapsed since transmission of the first data message without reception of a first status PDU, the UE may transmit a first polling message that requests the first status PDU. The first status PDU may include feedback for the first data message. The UE may transmit the first polling message based on the time duration satisfying the threshold time duration event.

19 Claims, 13 Drawing Sheets

(56) References Cited

U.S. PATENT DOCUMENTS

| | | | | |
|---|---|---|---|---|
| 2010/0238875 | A1* | 9/2010 | Sung | H04W 28/26 370/329 |
| 2013/0039269 | A1* | 2/2013 | Kubota | H04L 1/1685 370/328 |
| 2018/0049266 | A1* | 2/2018 | Eklöf | H04L 1/189 |
| 2019/0140783 | A1* | 5/2019 | Yerramalli | H04L 1/1816 |
| 2021/0243795 | A1* | 8/2021 | Kuo | H04L 1/1822 |
| 2022/0053450 | A1* | 2/2022 | Khoryaev | H04L 5/0048 |
| 2023/0076524 | A1* | 3/2023 | Fujishiro | H04L 47/32 |
| 2023/0209508 | A1* | 6/2023 | Liu | H04L 5/0058 370/329 |
| 2023/0354374 | A1* | 11/2023 | Rastegardoost | H04W 72/04 |
| 2024/0089951 | A1* | 3/2024 | Zhang | H04W 72/0446 |

* cited by examiner

Output a configuration message indicating a threshold time duration event associated with transmission of a polling message for requesting a status PDU, the threshold time duration event corresponding to a time period following transmission of a data message without reception of the status PDU

1305

Obtain a first polling message that requests a first status PDU including feedback for a first data message based on a time duration satisfying the threshold time duration event, the polling message indicating that the time duration has elapsed since communication of the first data message without reception of the first status PDU

1310

1300

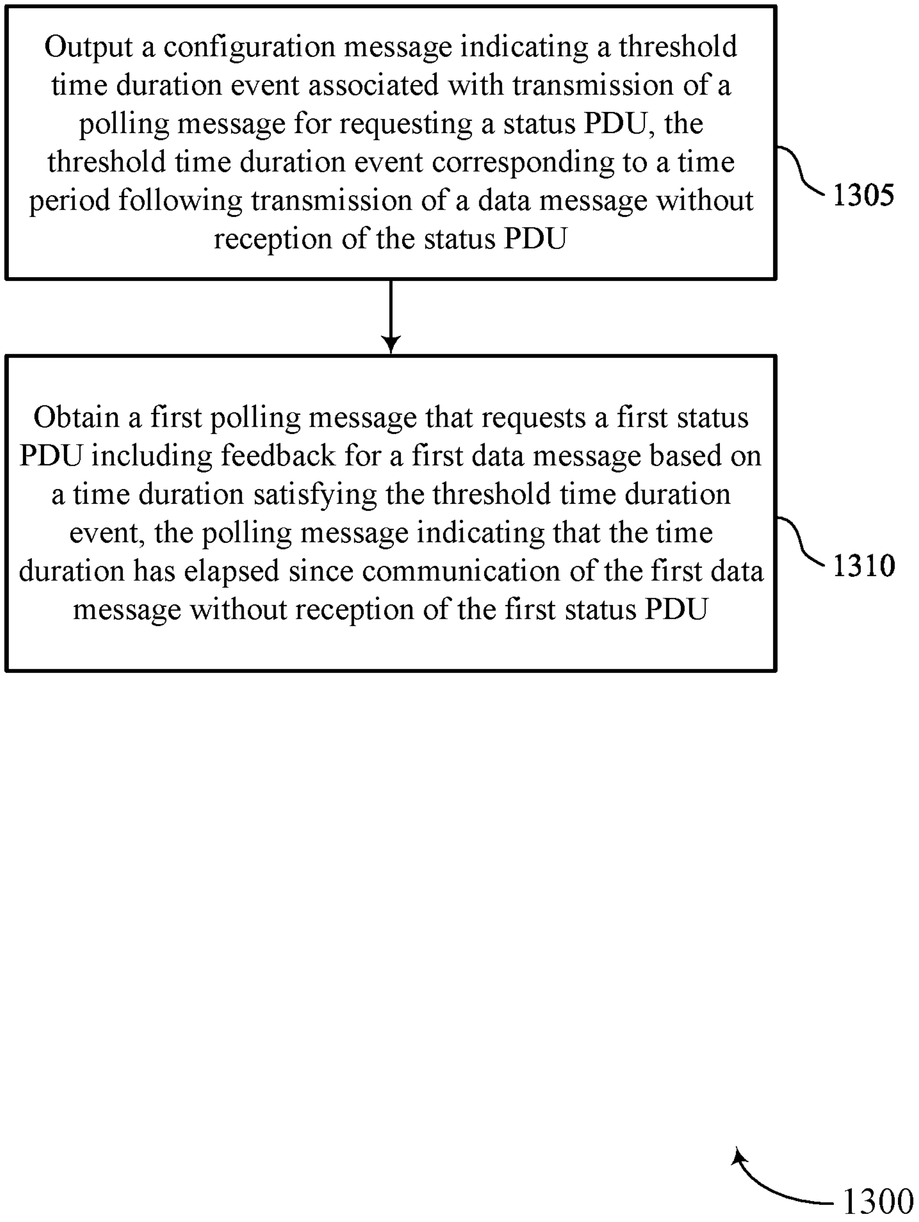

FIG. 13

POLLING IMPROVEMENTS FOR RADIO LINK CONTROL

FIELD OF TECHNOLOGY

The following relates to wireless communications, including polling improvements for radio link control (RLC).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support polling improvements for radio link control (RLC). For example, the described techniques provide for time duration threshold events that are configured at a user equipment (UE) and that trigger transmission of a polling message to poll for a status protocol data unit (PDU) from a network entity. For example, the UE may, to prevent expiration of a packet delay budget for a data message (e.g., PDU), request a status for the data message. Requesting the status for the data transmission (e.g., via a polling message) may be based on a delay that is calculated for each data message that the UE is scheduled for, or that the UE transmits. For example, the delay may be calculated in accordance with a packet delay budget for the data message, or the delay may be maintained by a timer that updates based on the time elapsed since a previous retransmission of the data message. The UE may poll for a status PDU from the network entity based on the delay satisfying a threshold time duration and may obtain feedback for the data message via the status PDU.

A method for wireless communications by a UE is described. The method may include receiving a configuration message indicating a threshold time duration event associated with transmission of a polling message for requesting a status PDU, the threshold time duration event corresponding to a time period following transmission of a data message without reception of the status PDU, transmitting a first data message, and transmitting, after a time duration has elapsed since transmission of the first data message without reception of a first status PDU, a first polling message that requests the first status PDU including feedback for the first data message, the time duration satisfying the threshold time duration event.

A UE for wireless communications is described. The UE may include one or more memories storing processor executable code, and one or more processors coupled with the one or more memories. The one or more processors may individually or collectively be operable to execute the code to cause the UE to receive a configuration message indicating a threshold time duration event associated with transmission of a polling message for requesting a status PDU, the threshold time duration event corresponding to a time period following transmission of a data message without reception of the status PDU, transmit a first data message, and transmit, after a time duration has elapsed since transmission of the first data message without reception of a first status PDU, a first polling message that requests the first status PDU including feedback for the first data message, the time duration satisfying the threshold time duration event.

Another UE for wireless communications is described. The UE may include means for receiving a configuration message indicating a threshold time duration event associated with transmission of a polling message for requesting a status PDU, the threshold time duration event corresponding to a time period following transmission of a data message without reception of the status PDU, means for transmitting a first data message, and means for transmitting, after a time duration has elapsed since transmission of the first data message without reception of a first status PDU, a first polling message that requests the first status PDU including feedback for the first data message, the time duration satisfying the threshold time duration event.

A non-transitory computer-readable medium storing code for wireless communications is described. The code may include instructions executable by one or more processors to receive a configuration message indicating a threshold time duration event associated with transmission of a polling message for requesting a status PDU, the threshold time duration event corresponding to a time period following transmission of a data message without reception of the status PDU, transmit a first data message, and transmit, after a time duration has elapsed since transmission of the first data message without reception of a first status PDU, a first polling message that requests the first status PDU including feedback for the first data message, the time duration satisfying the threshold time duration event.

In some examples of the method, UEs, and non-transitory computer-readable medium described herein, transmitting the first polling message may include operations, features, means, or instructions for transmitting the first polling message based on a value of a timer satisfying the threshold time duration event, the timer being initiated based least in part on transmission of the first data message.

Some examples of the method, UEs, and non-transitory computer-readable medium described herein may further include operations, features, means, or instructions for receiving a feedback message including first feedback for the first data message, where a timer may be released based on reception of the feedback message and transmitting a first retransmission of the first data message, where the timer may be reset and restarted based on transmission of the first retransmission.

In some examples of the method, UEs, and non-transitory computer-readable medium described herein, the time duration may be based on an amount of time that may have elapsed since arrival of the first data message at a packet data convergence protocol (PDCP) layer of the UE without reception of an acknowledgement for the first data message.

In some examples of the method, UEs, and non-transitory computer-readable medium described herein, the threshold time duration event may be associated with a packet delay budget for the first data message.

In some examples of the method, UEs, and non-transitory computer-readable medium described herein, the threshold time duration event may be associated with a quality of service flow, a PDU set, a packet priority, or any combination thereof.

In some examples of the method, UEs, and non-transitory computer-readable medium described herein, transmitting the first polling message may include operations, features, means, or instructions for transmitting the first polling message indicating one or more sequence numbers (SNs) associated with one or more data messages including the first data message, the control message indicating that a respective delay associated with reception of a respective status PDU for the one or more data messages satisfies the threshold time duration event.

In some examples of the method, UEs, and non-transitory computer-readable medium described herein, transmitting the first polling message may include operations, features, means, or instructions for transmitting the first polling message indicating a range of data messages or a quantity of data messages, where a respective delay associated with reception of a respective status PDU for the range of data messages or the quantity of data messages satisfies the threshold time duration event.

In some examples of the method, UEs, and non-transitory computer-readable medium described herein, transmitting the first polling message may include operations, features, means, or instructions for transmitting a dynamic scheduling request (DSR) medium access control-control element (MAC-CE).

In some examples of the method, UEs, and non-transitory computer-readable medium described herein, the configuration message may be a radio resource control (RRC) message.

A method for wireless communications by a network entity is described. The method may include outputting a configuration message indicating a threshold time duration event associated with transmission of a polling message for requesting a status PDU, the threshold time duration event corresponding to a time period following transmission of a data message without reception of the status PDU and obtaining a first polling message that requests a first status PDU including feedback for a first data message based on a time duration satisfying the threshold time duration event, the first polling message indicating that the time duration has elapsed since communication of the first data message without reception of the first status PDU.

A network entity for wireless communications is described. The network entity may include one or more memories storing processor executable code, and one or more processors coupled with the one or more memories. The one or more processors may individually or collectively be operable to execute the code to cause the network entity to output a configuration message indicating a threshold time duration event associated with transmission of a polling message for requesting a status PDU, the threshold time duration event corresponding to a time period following transmission of a data message without reception of the status PDU and obtain a first polling message that requests a first status PDU including feedback for a first data message based on a time duration satisfying the threshold time duration event, the first polling message indicating that the time duration has elapsed since communication of the first data message without reception of the first status PDU.

Another network entity for wireless communications is described. The network entity may include means for outputting a configuration message indicating a threshold time duration event associated with transmission of a polling message for requesting a status PDU, the threshold time duration event corresponding to a time period following transmission of a data message without reception of the status PDU and means for obtaining a first polling message that requests a first status PDU including feedback for a first data message based on a time duration satisfying the threshold time duration event, the first polling message indicating that the time duration has elapsed since communication of the first data message without reception of the first status PDU.

A non-transitory computer-readable medium storing code for wireless communications is described. The code may include instructions executable by one or more processors to output a configuration message indicating a threshold time duration event associated with transmission of a polling message for requesting a status PDU, the threshold time duration event corresponding to a time period following transmission of a data message without reception of the status PDU and obtain a first polling message that requests a first status PDU including feedback for a first data message based on a time duration satisfying the threshold time duration event, the first polling message indicating that the time duration has elapsed since communication of the first data message without reception of the first status PDU.

In some examples of the method, network entities, and non-transitory computer-readable medium described herein, the threshold time duration event may be associated with a packet delay budget for the first data message.

In some examples of the method, network entities, and non-transitory computer-readable medium described herein, the threshold time duration event may be associated with a quality of service flow, a PDU set, a packet priority, or any combination thereof.

In some examples of the method, network entities, and non-transitory computer-readable medium described herein, obtaining the first polling message may include operations, features, means, or instructions for obtaining the first polling message indicating one or more SNs associated with one or more data messages including the first data message, the control message indicating that a respective delay associated with a respective status PDU for the one or more data messages satisfies the threshold time duration event.

In some examples of the method, network entities, and non-transitory computer-readable medium described herein, obtaining the first polling message may include operations, features, means, or instructions for obtaining the first polling message indicating a range of data messages or a quantity of data messages, where a respective delay associated with a respective status PDU for the range of data messages or the quantity of data messages satisfies the threshold time duration event.

In some examples of the method, network entities, and non-transitory computer-readable medium described herein, obtaining the first polling message may include operations, features, means, or instructions for obtaining a DSR MAC-CE.

In some examples of the method, network entities, and non-transitory computer-readable medium described herein, the configuration message may be an RRC message.

BRIEF DESCRIPTION OF THE DRAWINGS

FIGS. 12 and 13 show flowcharts illustrating methods that support polling improvements for RLC in accordance with one or more aspects of the present disclosure.

DETAILED DESCRIPTION

In some wireless communications systems, a user equipment (UE) may transmit a message (e.g., a radio link control (RLC) message) to a network entity and may wait to receive a status of the message (e.g., acknowledgement (ACK)/non-acknowledgement (NACK)) via a status protocol data unit (PDU). In some examples, the UE may, based on a quantity of service data units (SDUs) or bytes that have gone unacknowledged by the network entity or based on a static polling timer, poll the network entity for the status PDU. For example, the UE may set a polling bit of an acknowledged mode PDU to one. However, for PDUs with a relatively short packet delay budget, the PDU may miss a deadline because an amount of time that the UE waits for feedback (e.g., ACK/NACK) from the network entity regarding the PDU may be excessively long.

In accordance with examples described herein, to reduce latency of status PDUs, a UE may poll for the status PDU based on satisfaction of a time duration threshold event. For example, the UE may be configured with a time duration threshold (e.g., Time_Without_POLL), which may be specific to a sequence number (SN) associated with a PDU, and the UE may poll the network entity for the status PDU once the time duration threshold has elapsed. The time duration threshold may apply to each retransmission of the PDU, or may correspond to a time duration that has elapsed since an initial transmission of the PDU (e.g., or a packet delay budget), without the UE receiving an ACK message. In some examples, the UE may transmit a polling message to the network entity that indicates a status (e.g., expiration, remaining time of packet delay budget) of respective PDUs to indicate whether the respective PDU satisfies, or is nearing satisfaction of, the time duration threshold event.

Aspects of the disclosure are initially described in the context of wireless communications systems. Aspects of the disclosure are further described in the context of signaling diagrams and process flows. Aspects of the disclosure are further illustrated by and described with reference to apparatus diagrams, system diagrams, and flowcharts that relate to polling improvements for RLC.

Figure 1:
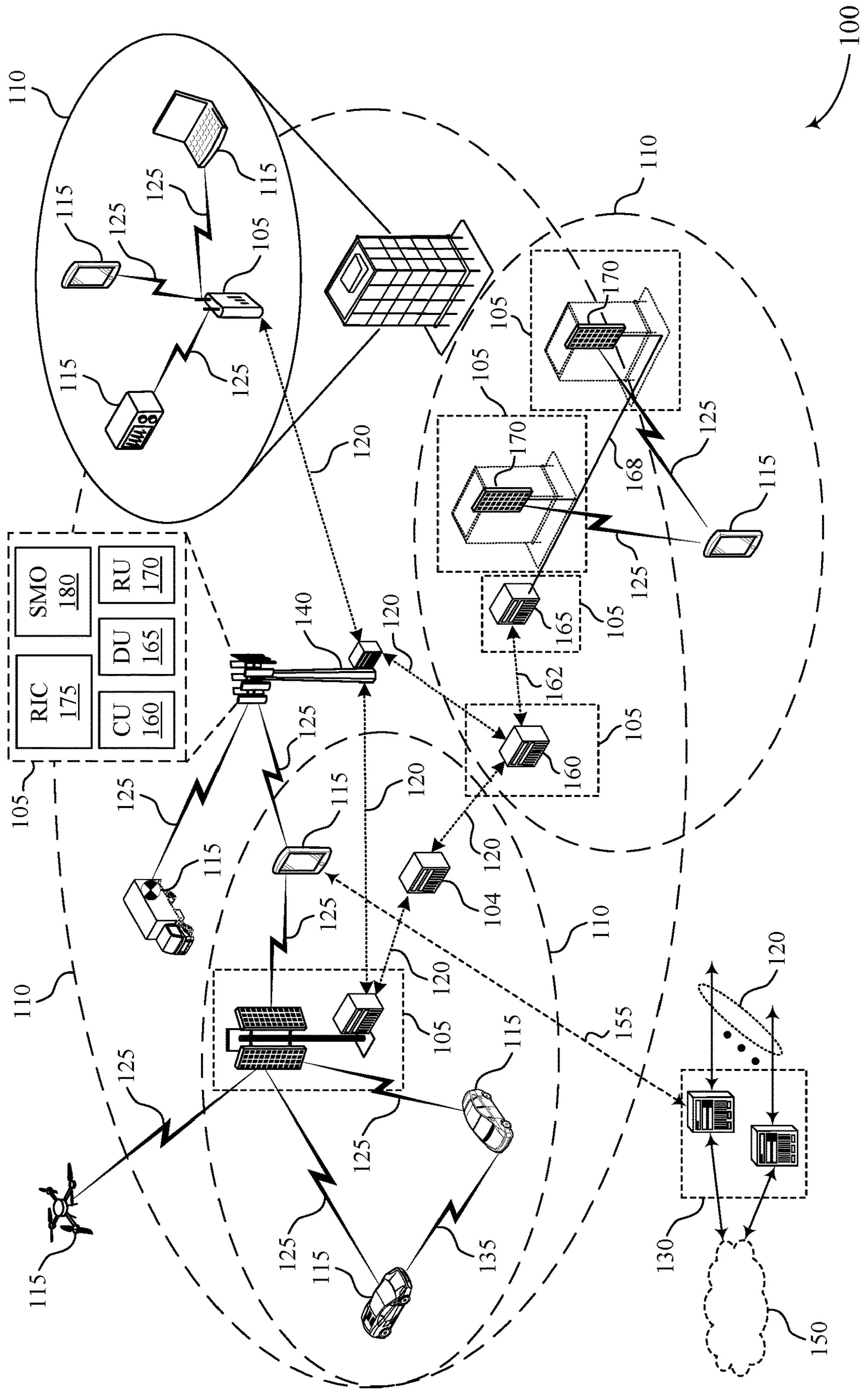
FIG. 1 shows an example of a wireless communications system that supports polling improvements for radio link control (RLC) in accordance with one or more aspects of the present disclosure.

FIG. 1 shows an example of a wireless communications system 100 that supports polling improvements for RLC in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., RLC layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may receive a configuration message indicating a threshold time duration event associated with transmission of a polling message for requesting a status PDU. The threshold time duration event may correspond to a time period following transmission of a data message without reception of the status PDU (e.g., ACK/NACK). The UE 115 may transmit a first data message. After a time duration has elapsed since transmission of the first data message without reception of a first status PDU (e.g., the threshold time duration event occurs), the UE may transmit a first polling message that requests the first status PDU. The first status PDU may include feedback for the first data message. The UE 115 may transmit the polling message based on the time duration satisfying the threshold time duration event.

Figure 2:
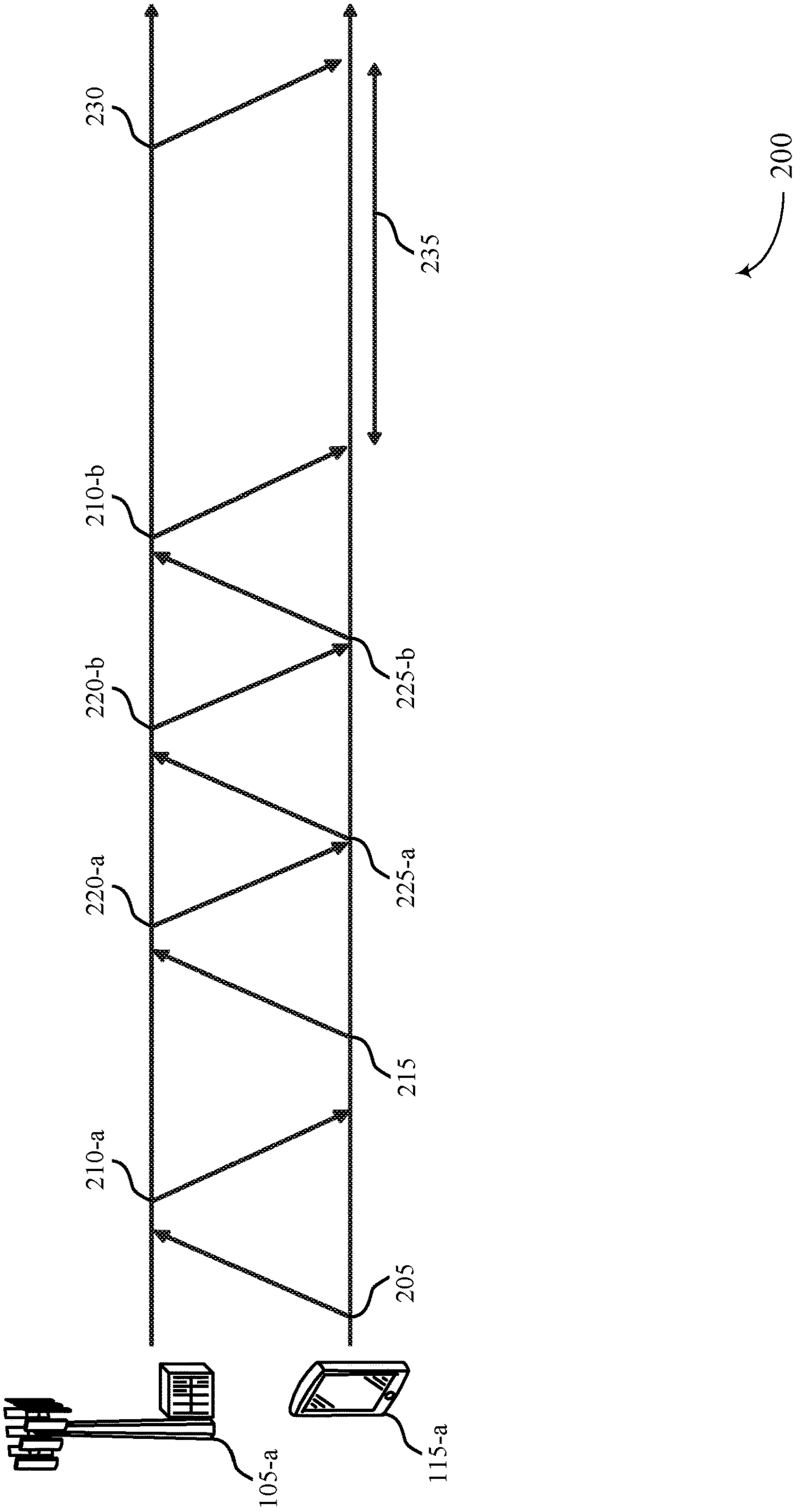
FIG. 2 shows an example of a signaling diagram that supports polling improvements for RLC in accordance with one or more aspects of the present disclosure.

FIG. 2 shows an example of a signaling diagram 200 that supports polling improvements for RLC in accordance with one or more aspects of the present disclosure. The signaling diagram 200 may implement or may be implemented by aspects of the wireless communications system 100. For example, the signaling diagram may include a UE 115-*a* and a network entity 105-*a*, which may be examples of corresponding devices as described herein.

To request scheduling of one or more uplink messages (e.g., in an RLC acknowledged mode), the UE 115-*a* may transmit a scheduling request 205. In response to the scheduling request 205, the network entity 105-*a* may transmit a downlink control information (DCI) message 210-*a* that schedules at least a first uplink transmission 215. The UE 115-*a* may experience various delays before or during transmission of the first uplink transmission 215. For example, the UE 115-*a* may have SDUs that are ahead of the first uplink transmission 215 in a queue, and the UE 115-*a* may transmit the SDUs ahead of the uplink transmission 215. There may be a round trip time (RTT) delay associated with the UE 115-*a* transmitting the scheduling request 205 and receiving the DCI message 210-*a* in response. Additionally, or alternatively, the UE 115-*a* may transmit a buffer status report (BFR) in addition to the scheduling request 205 or may wait for additional grants (e.g., in cases of segmentation), which may add to the RTT delay. The RTT delay may vary based on additional factors (e.g., modulation and coding scheme (MCS), power amplifier at the UE 115-*a*).

In some examples, the network entity 105-*a* may transmit a NACK message 220-*a* in response to the uplink transmission 215. Based on receiving the NACK message 220-*a*, the UE 115-*a* may transmit a retransmission 225-*a* of the uplink transmission 215. In some cases, the UE 115-*a* may continue to send retransmissions 225 (e.g., a retransmission 225-*b* based on receiving a NACK message 220-*b*) until a DCI message 210-*b* is received from the network entity 105-*a* that includes a toggled new data indicator. In other words, the quantity of retransmissions may be determined by the network entity 105-*a*. A total delay caused by the UE 115-*a* retransmitting the message may be described by RTT*N, where RTT may be a round trip delay of each retransmission 225 and N may be a quantity of retransmissions 225 that the UE 115-*a* transmits.

In some examples, in response to the UE 115-*a* receiving the DCI message 210-*b* that includes the new data indicator, a packet (e.g., PDU) may arrive at a packet data convergence protocol (PDCP) layer of the UE 115-*a*. The packet may be identified by an SN. There may be a delay from when the packet arrives at the PDCP layer (e.g., is generated, is added to a buffer of the UE 115-*a*) and when the UE 115-*a* receives a status PDU 230 for the packet. For example, the status PDU may identify the SN of the packet and may indicate whether the SN is acknowledged or non-acknowledged. The delay for obtaining the status for the packet at the UE 115-*a* may be caused by various factors. For example, there may be a delay (e.g., >1 RTT delay) associated with the UE 115-*a* identifying (e.g., detecting) a hole in the RLC SNs. In other words, the UE 115-*a* may track feedback from the network entity 105-*a* for each SN of packets that the UE 115-*a* transmits, and the UE 115-*a* may identify that at least one SN is absent of feedback.

In some examples, there may be a delay associated with a reassembly timer. In other examples, the reassembly timer may not be used and the network entity 105-*a* may transmit the status PDU 230 without delay of a timer for packets (e.g., traffic) with low packet delay budget. In some examples, there may be a delay associated with transmission of the status PDU 230 by the network entity 105-*a*. For example, the delay may be caused by loss of the status PDU 230 at the UE 115-*a*, or the network entity 105-*a* may have to retransmit the status PDU 230 (e.g., due to segmentation), or both.

In some examples, aspects of the status PDU 230 may be modified to reduce latency of the status PDU 230. For example, the status PDU 230 may have enhanced encoding, may not include NACK information previously signaled by the network entity 105-*a* if the feedback has not changed, may have compressed status (e.g., feedback) information, may transmit relatively less information than some other status PDUs (e.g., only window beginning) including dynamically controlling a size of the status information, may enable status PDU segmentation and/or modify the status information to be segmentation compatible, or a combination thereof.

In accordance with examples described herein, a duration 235 that the UE 115-*a* waits to receive the status PDU 230 may be reduced, for example, by changing a polling behavior at the UE 115-*a*. In some examples, the UE 115-*a* may poll, via a polling message, for the status PDU from the network entity 105-*a*. For example, the UE 115-*a* may add a polling bit to an RLC PDU header. Polling may be a function of the quantity of SDUs (e.g., packets) or bytes that are unacknowledged or may be a function of a static polling timer, which may lead to high waiting times of PDUs before retransmission (e.g., prior to a retransmission 225 being sent by the UE 115-*a* for the PDU). For short packet delay budgets, this may lead to a PDU missing a deadline (e.g., packet delay budget deadline) because retransmission may be slow or may have a high latency. In some examples, a UE 115-*a* may transmit a polling message to the network entity 105-*a* based on one or more trigger events (e.g., expiration of a packet delay budget, a time threshold that is updated or maintained per SN). In some examples, PDCP layer signaling may enable the UE 115-*a* to indicate to the network entity 105-*a* a SN gap or missing SNs (e.g., a list of SNs that have not received feedback).

In some examples, the UE 115-*a* may be configured with a time threshold (e.g., Time_Without_POLL). If the time threshold is exceeded (e.g., satisfied), the UE 115-*a* may trigger polling by setting a poll bit in an acknowledged mode PDU (e.g., a PDU transmitted to the network entity 105-*a*) to a first value (e.g., 1). In some cases, the UE 115-*a* may apply the time threshold for retransmissions of a packet by having a timer (e.g., SN_STATUS_Delay) that is maintained per PDU SN. Once the timer for an SN (e.g., a PDU identified by or corresponding to the SN) exceeds the configured threshold, the UE 115-*a* may follow the polling procedure by setting the poll bit (e.g., P=1) in the next transmission of an acknowledged mode PDU. This timer may be released once the SN is acknowledged and may reset and/or restart after, or based on, each transmission (e.g., after transmission 215, after retransmission 225-*a*, after retransmission 225-*b*) of the SN. In other words, the timer may restart at each transmission (e.g., of the SN PDU) and may prevent any one PDU from excessive waiting before the PDU receives feedback (e.g., is acknowledged or non-acknowledged at the network entity 105-*a*). In some examples, the time threshold may be a function of the packet delay budget. As such, the time threshold may be dynamic and may differ for different packets (e.g., different SNs).

In some other cases, the UE 115-*a* may apply the time threshold for an overall delay of a packet (e.g., irrespective of retransmission) by having a timer (e.g., PDU delay) that is maintained per PDU SN but that does not reset when the UE 115-*a* transmits a retransmission 225 of a transmission 215. In other words, the timer may be calculated, or initiated, based on PDU arrival at the PDCP layer of the UE 115-*a* and maintained (e.g., not reset) until the SN is acknowledged, irrespective of previous transmission or retransmission of the PDU. In this way, the timer may reflect a packet delay for the transmission 215, and the time threshold may correspond to a packet delay budget for the transmission 215. After some time has elapsed since arrival of the PDU at the PDCP layer without the UE 115-*a* receiving the status PDU 230, the timer may exceed, or satisfy, the time threshold (Time_Without_POLL) and the UE 115-*a* may perform polling and transmit a polling message to the network entity 105-*a*.

In some examples, the polling behavior by the UE 115-*a* that is based on the time threshold or the trigger event may apply to low latency data packets. For example, the network entity 105-*a* may configure the polling behavior at the UE 115-*a* to indicate that the time threshold and/or trigger event for polling applies to data packets (e.g., PDUs) of a quality of service (QOS) flow, of a PDU set, or of a packet priority (e.g., a priority that exceeds a threshold packet priority).

Figure 3:
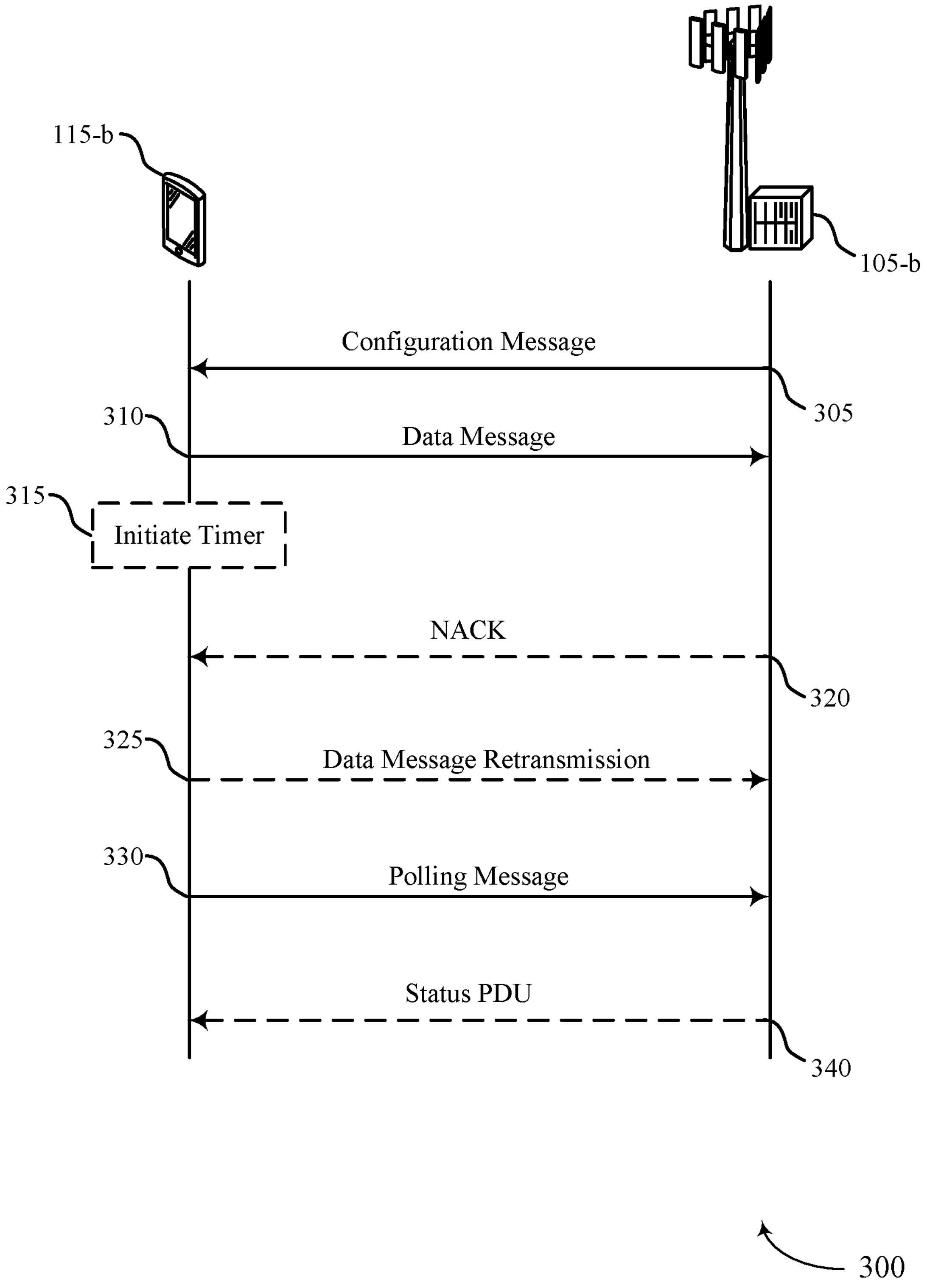
FIG. 3 shows an example of a process flow that supports polling improvements for RLC in accordance with one or more aspects of the present disclosure.

FIG. 3 shows an example of a process flow 300 that supports polling improvements for RLC in accordance with one or more aspects of the present disclosure. The process flow 300 may implement or may be implemented by aspects of the wireless communications system 100. For example, the process flow 300 may include a UE 115-*b* and a network entity 105-*b*, which may be examples of corresponding devices as described herein.

In the following description of process flow 300, the operations between the UE 115-*b* and the network entity 105-*b* may be performed in a different order than the order shown, or other operations may be added or removed from the process flow 300. For example, some operations may also be omitted from the process flow 300, or may be performed in different orders or at different times. Further, although some operations or signaling may be shown to occur at different times for discussion purposes, these operations may actually occur at the same time. Although the UE 115-*b* and the network entity 105-*b* are shown performing the operations of process flow 300, some aspects of some operations may also be performed by one or more other wireless or network devices.

At 305, the UE 115-*b* may receive a configuration message indicating a threshold time duration event associated with (e.g., to trigger) transmission of a polling message for requesting a status PDU. The threshold time duration event may correspond to a time period (e.g., a duration 235), following transmission (e.g., or retransmission) of a first data message without reception of the status PDU, elapsing that satisfied a threshold time duration. In some examples, the threshold time duration may be expiration of a packet delay budget. For example, the UE 115-*a* may track a time period (e.g., by maintaining a timer) that has elapsed since arrival of the first data message at a PDCP layer of the UE 115-*b* without reception of an ACK for the first data message before the threshold time duration has elapsed. In some cases, the configuration message may indicate that the threshold time duration event is applicable to a quality of service flow, a PDU set, a packet priority, or a combination thereof. In some examples, the configuration may indicate a plurality of threshold time duration events each corresponding to a respective SN, a respective quality of service flow, a respective PDU set, a respective packet priority, or a combination thereof. The UE 115-*b* may receive the configuration message via an RRC message. For example, the RRC message may configure the polling behavior for PDUs (e.g., the threshold time duration event, one or more parameters for applying the threshold time duration event to PDUs) in one or more fields carried in the RRC message (e.g., RLC-Config).

At 310, the UE 115-*b* may transmit the first data message. The first data message may be a PDU (e.g., an RLC PDU). The first data message may be identified by, or may otherwise correspond to, a SN. At 315, the UE 115-*b* may initiate a timer. The UE 115-*b* may initiate the timer based on the UE 115-*b* transmitting the first data message. For example, the timer, which may be specific to or correspond to a respective PDU (e.g., or SN of a PDU), may be initiated (e.g., or restarted) after each transmission or retransmission of the PDU. In some examples, the UE 115-*b* may initiate the timer based on an arrival of the first data message (e.g., or a different data message) at a PDCP layer of the UE 115-*b*. In such examples, the timer may reflect a packet delay of the PDU, and the timer may satisfy the threshold time duration event based on a value of the timer being equal to the packet delay budget for the first data message.

At 320, the UE 115-*b* may receive a feedback message including first feedback (e.g., NACK) for the first data message. The UE 115-*a* may release the timer (e.g., reset the timer to zero) based on receiving the feedback message. At 325, the UE 115-*b* may transmit a first retransmission of the first data message. The UE 115-*a* may reset and/or restart the timer based on transmitting the first retransmission. In some examples, the UE 115-*a* may repeat the process of resetting and/or restarting the timer for each retransmission of the first data message.

At 330, the UE 115-*b* may transmit, after a time duration (e.g., the duration 235) has elapsed since transmission of the first data message without reception of a first status PDU, a first polling message that requests the first status PDU including feedback for the first data message. The UE 115-*b* may transmit the polling message based on the time duration satisfying the threshold time duration event. For example, the time duration may indicate an expiration of a packet delay budget for the first data message or may satisfy a configured time threshold (e.g., configured at 305) for a SN of the first data message. In some examples, the polling message may be a dynamic scheduling request (DSR) MAC-control element (MAC-CE) and the DSR MAC-CE may be configured (e.g., RRC configured) to trigger after a time duration, satisfying a time duration threshold, has elapsed since transmission of the first data message (e.g., or retransmission of the first data message) without reception of a status PDU (e.g., a status report indicating ACK/NACK). In some cases, a trigger may be provided for sending a DSR for transmission of a data message. In an example, a data message (e.g. PDU) has waited to much time without receiving a STATUS report indicating ACK/NACK, the UE 115-*b* may transmit a DSR requesting a status PDU for the data message. In some examples, control signaling, such as the configuration message received at 305, may indicate a time duration threshold and the UE 115-*b* may transmit the DSR requesting the status PDU subsequent to identifying that a time duration threshold event has occurred (e.g., a time duration since transmission of the data message that exceeds the time duration threshold has elapsed). The time duration may be calculated for each retransmission of the first data message such that the DSR may be triggered if a time duration since a respective retransmission satisfies the threshold with the time duration resetting after each retransmission of the data message.

In some examples, the polling message (e.g., a control message or control PDU) may indicate one or more SNs associated with one or more data messages (e.g., one or more PDUs) that are delayed (e.g., beyond a threshold) because the UE 115-*a* has not received feedback for the one or more data messages. The UE 115-*a* may include, in the polling message, indications of one or more SNs of one or more transmissions of data messages based on one or more of the data messages satisfying a configured threshold time duration event, as described in greater detail with reference to 305. In some examples, the polling message may include a field (e.g., a control PDU type (CPT) field) set to a defined value (e.g., 001) for indicating that the polling message is identifying one or more SNs associated with one or more data messages (e.g., one or more PDUs) that are delayed. In some examples, the polling message may indicate, for each SN PDU of a set of SN PDUs (e.g., data messages), a remaining time until a timer (e.g., or time period since transmission of a PDU or data message) for the SN PDU satisfies the threshold time duration event. The polling message may indicate to the network entity 105-*b* a subset of PDUs that may be approaching expiry (e.g., expiry of a packet delay budget). In response to the polling message, the network entity 105-*b* may acknowledge PDUs (or SDUs) indicated by the polling message that the network entity 105-*b* successfully received and may schedule other PDUs (or SDUs) (e.g., non-acknowledged or not successfully received) for retransmission. In some examples, to reduce overhead of the polling message, the one or more PDUs identified in the polling message may be the one or more PDUs that are waiting for retransmission (e.g., and one or more other PDUs may not be indicated in the polling message). In some cases, the polling message may be a MAC-CE (e.g., the indication of the one or more SNs and/or timing information may be encoded in the MAC-CE). Additionally, or alternatively, the polling message may indicate a range of data messages (e.g., a range of SNs) or a quantity of data messages for which a respective delay for receiving a status PDU for the range of data messages or the quantity of data messages satisfies the threshold time duration event. The polling message may request, or trigger, the status PDU from the network entity 105-*b* (e.g., prior to a packet delay budget expiration for one or more SNS).

At 340, the UE 115-*b* may receive a status PDU. The UE 115-*b* may receive the status PDU in response to the polling message. The status PDU may include feedback for the first data message. In some examples, the status PDU may include one or more identifiers of one or more SNs and may include a status (e.g., acknowledged, non-acknowledged) for each of the one or more SNs.

Figure 4:
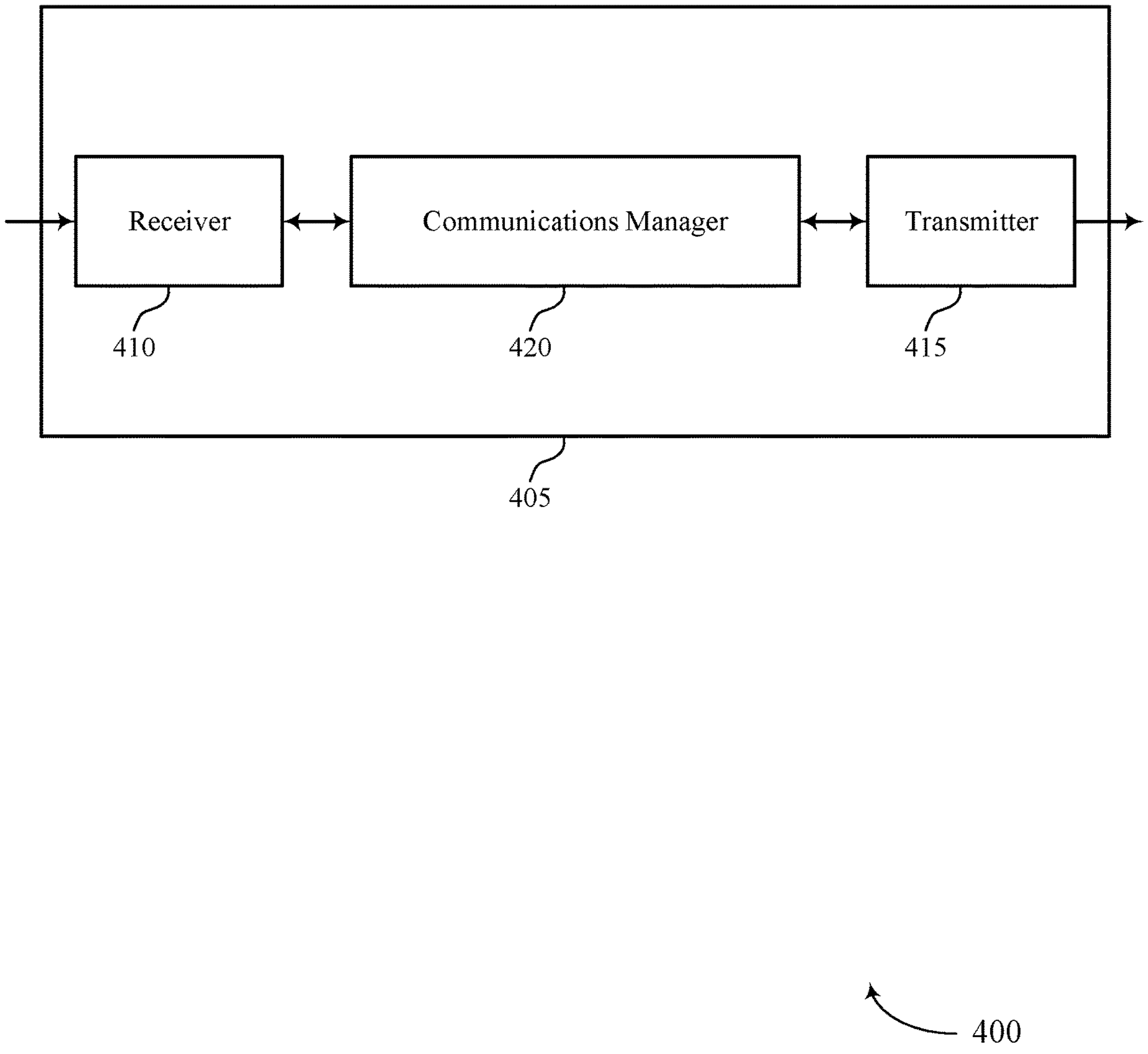
FIGS. 4 and 5 show block diagrams of devices that support polling improvements for RLC in accordance with one or more aspects of the present disclosure.

FIG. 4 shows a block diagram 400 of a device 405 that supports polling improvements for RLC in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to polling improvements for RLC). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to polling improvements for RLC). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of polling improvements for RLC as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving a configuration message indicating a threshold time duration event associated with transmission of a polling message for requesting a status PDU, the threshold time duration event corresponding to a time period following transmission of a data message without reception of the status PDU. The communications manager 420 is capable of, configured to, or operable to support a means for transmitting a first data message. The communications manager 420 is capable of, configured to, or operable to support a means for transmitting, after a time duration has elapsed since transmission of the first data message without reception of a first status PDU, a first polling message that requests the first status PDU including feedback for the first data message, the time duration satisfying the threshold time duration event.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced processing and reduced power consumption by enabling a UE to more efficiently receive feedback for data messages, which may result in the UE remaining in an idle state for less time, which reduces resource consumption and power waste.

Figure 5:
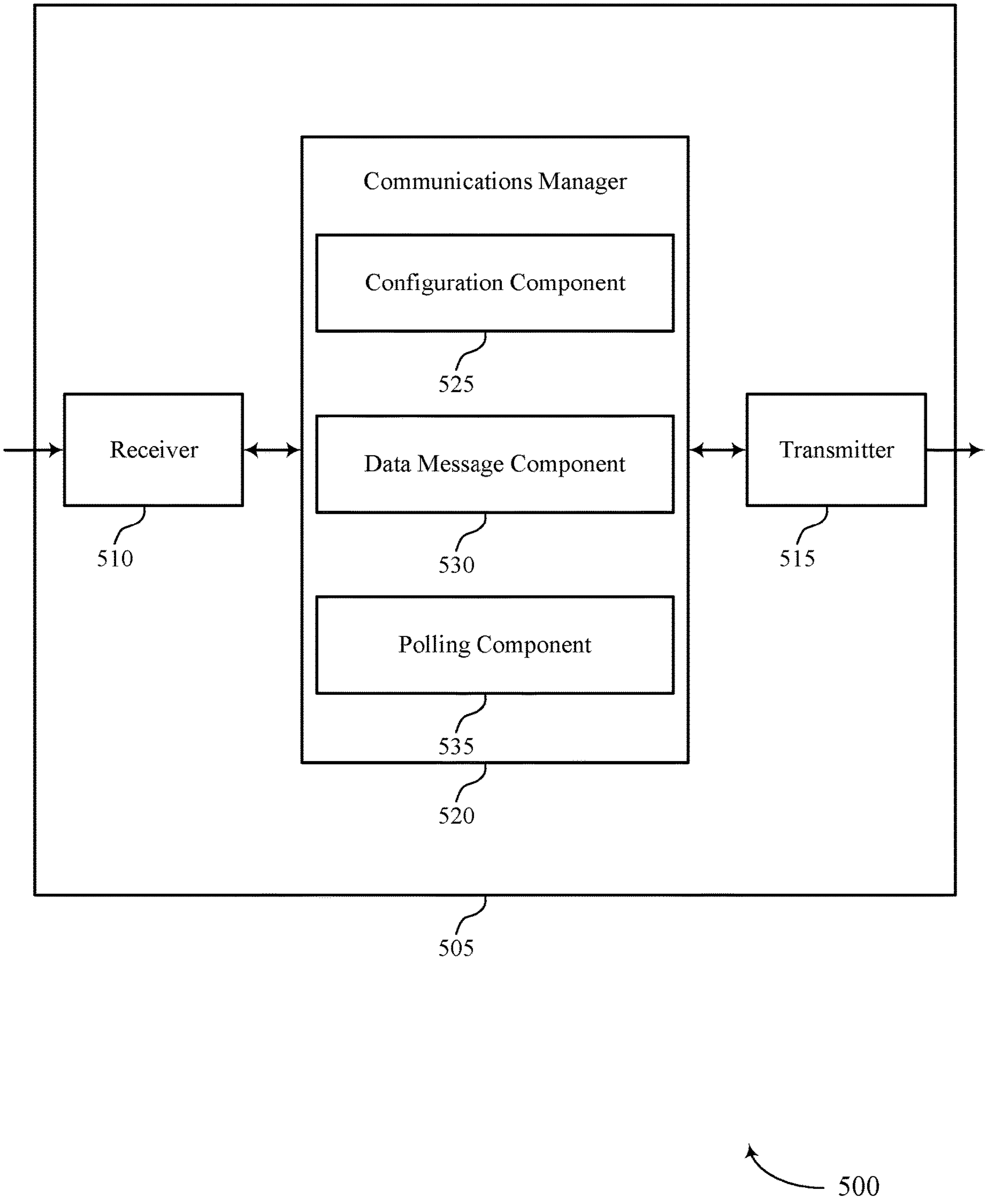

FIG. 5 shows a block diagram 500 of a device 505 that supports polling improvements for RLC in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to polling improvements for RLC). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to polling improvements for RLC). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of polling improvements for RLC as described herein. For example, the communications manager 520 may include a configuration component 525, a data message component 530, a polling component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The configuration component 525 is capable of, configured to, or operable to support a means for receiving a configuration message indicating a threshold time duration event associated with transmission of a polling message for requesting a status PDU, the threshold time duration event corresponding to a time period following transmission of a data message without reception of the status PDU. The data message component 530 is capable of, configured to, or operable to support a means for transmitting a first data message. The polling component 535 is capable of, configured to, or operable to support a means for transmitting, after a time duration has elapsed since transmission of the first data message without reception of a first status PDU, a first polling message that requests the first status PDU including feedback for the first data message, the time duration satisfying the threshold time duration event.

Figure 6:
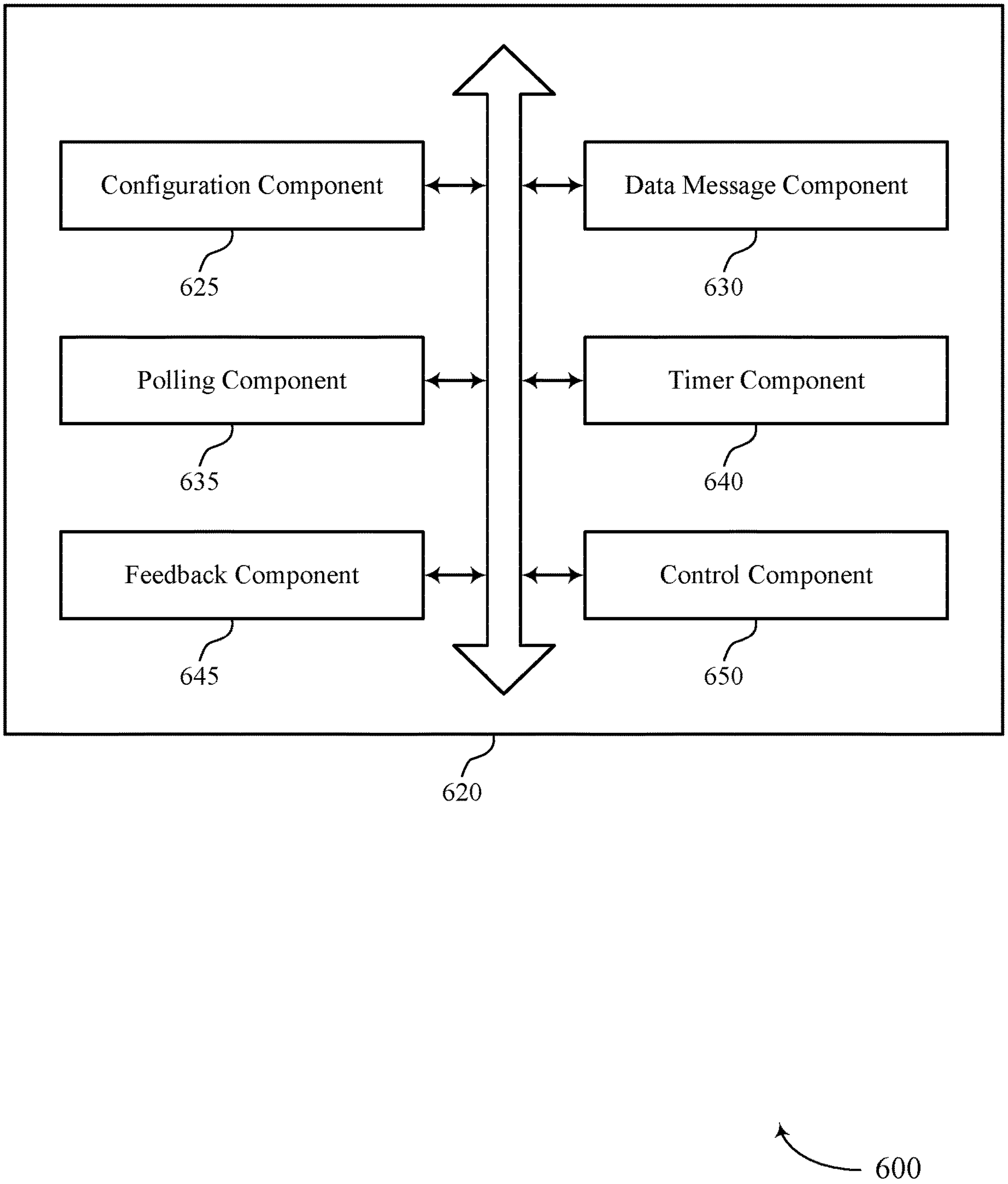
FIG. 6 shows a block diagram of a communications manager that supports polling improvements for RLC in accordance with one or more aspects of the present disclosure.

FIG. 6 shows a block diagram 600 of a communications manager 620 that supports polling improvements for RLC in accordance with one or more aspects of the present disclosure. The communications manager 620 may be an example of aspects of a communications manager 420, a communications manager 520, or both, as described herein. The communications manager 620, or various components thereof, may be an example of means for performing various aspects of polling improvements for RLC as described herein. For example, the communications manager 620 may include a configuration component 625, a data message component 630, a polling component 635, a timer component 640, a feedback component 645, a control component 650, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The configuration component 625 is capable of, configured to, or operable to support a means for receiving a configuration message indicating a threshold time duration event associated with transmission of a polling message for requesting a status PDU, the threshold time duration event corresponding to a time period following transmission of a data message without reception of the status PDU. The data message component 630 is capable of, configured to, or operable to support a means for transmitting a first data message. The polling component 635 is capable of, configured to, or operable to support a means for transmitting, after a time duration has elapsed since transmission of the first data message without reception of a first status PDU, a first polling message that requests the first status PDU including feedback for the first data message, the time duration satisfying the threshold time duration event.

In some examples, to support transmitting the first polling message, the timer component 640 is capable of, configured to, or operable to support a means for transmitting the first polling message based on a value of a timer satisfying the threshold time duration event, the timer being initiated based least in part on transmission of the first data message.

In some examples, the feedback component 645 is capable of, configured to, or operable to support a means for receiving a feedback message including first feedback for the first data message, where a timer is released based on reception of the feedback message. In some examples, the data message component 630 is capable of, configured to, or operable to support a means for transmitting a first retransmission of the first data message, where the timer is reset and restarted based on transmission of the first retransmission.

In some examples, the time duration is based on an amount of time that has elapsed since arrival of the first data message at a packet data convergence protocol layer of the UE without reception of an ACK for the first data message.

In some examples, the threshold time duration event is associated with a packet delay budget for the first data message.

In some examples, the threshold time duration event is associated with a quality of service flow, a PDU set, a packet priority, or any combination thereof.

In some examples, to support transmitting the first polling message, the control component 650 is capable of, configured to, or operable to support a means for transmitting the first polling message indicating one or more SNs associated with one or more data messages including the first data message, the first polling message indicating that a respective delay associated with reception of a respective status PDU for the one or more data messages satisfies the threshold time duration event.

In some examples, to support transmitting the first polling message, the control component 650 is capable of, configured to, or operable to support a means for transmitting the first polling message indicating a range of data messages or a quantity of data messages, where a respective delay associated with reception of a respective status PDU for the range of data messages or the quantity of data messages satisfies the threshold time duration event.

In some examples, to support transmitting the first polling message, the polling component 635 is capable of, configured to, or operable to support a means for transmitting a dynamic scheduling request (DSR) medium access control-control element (MAC-CE).

In some examples, the configuration message is an RRC message.

Figure 7:
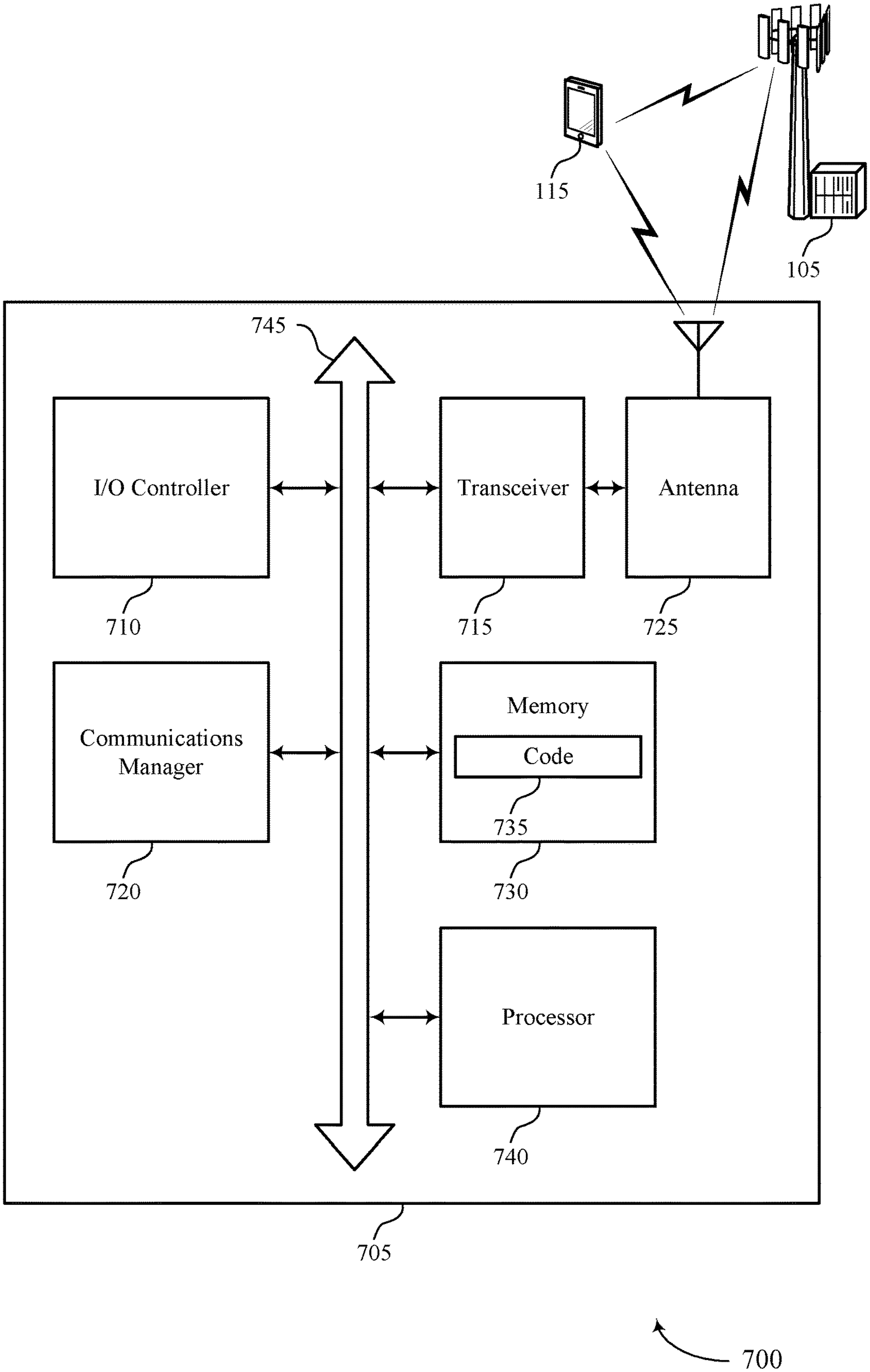
FIG. 7 shows a diagram of a system including a device that supports polling improvements for RLC in accordance with one or more aspects of the present disclosure.

FIG. 7 shows a diagram of a system 700 including a device 705 that supports polling improvements for RLC in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting polling improvements for RLC). For example, the device 705 or a component of the device 705 may include at least one processor 740 and at least one memory 730 coupled with or to the at least one processor 740, the at least one processor 740 and the at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving a configuration message indicating a threshold time duration event associated with transmission of a polling message for requesting a status PDU, the threshold time duration event corresponding to a time period following transmission of a data message without reception of the status PDU. The communications manager 720 is capable of, configured to, or operable to support a means for transmitting a first data message. The communications manager 720 is capable of, configured to, or operable to support a means for transmitting, after a time duration has elapsed since transmission of the first data message without reception of a first status PDU, a first polling message that requests the first status PDU including feedback for the first data message, the time duration satisfying the threshold time duration event.

By including or configuring the communications manager 720 in accordance with examples as described herein, the device 705 may support techniques for reduced latency and improved user experience by reducing latencies caused by the UE waiting to retransmit messages due to a lack of feedback from the network entity.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of polling improvements for RLC as described herein, or the at least one processor 740 and the at least one memory 730 may be otherwise configured to, individually or collectively, perform or support such operations.

Figure 8:
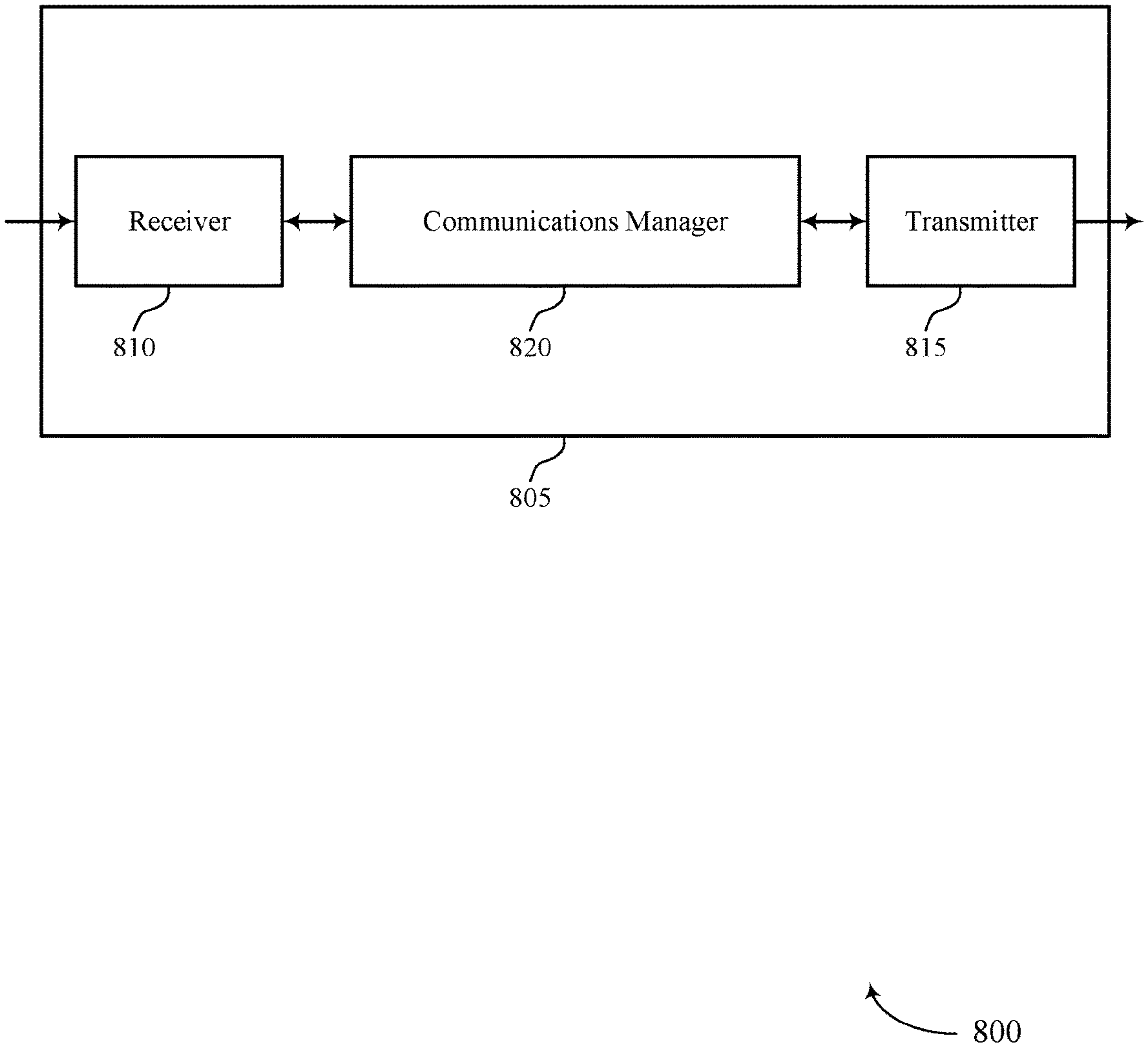
FIGS. 8 and 9 show block diagrams of devices that support polling improvements for RLC in accordance with one or more aspects of the present disclosure.

FIG. 8 shows a block diagram 800 of a device 805 that supports polling improvements for RLC in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, PDUs, SDUs) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, PDUs, SDUs) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of polling improvements for RLC as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for outputting a configuration message indicating a threshold time duration event associated with transmission of a polling message for requesting a status PDU, the threshold time duration event corresponding to a time period following transmission of a data message without reception of the status PDU. The communications manager 820 is capable of, configured to, or operable to support a means for obtaining a first polling message that requests a first status PDU including feedback for a first data message based on a time duration satisfying the threshold time duration event, the first polling message indicating that the time duration has elapsed since communication of the first data message without reception of the first status PDU.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for by enabling a UE to more efficiently receive feedback for data messages, which may result in the UE remaining in an idle state for less time, which reduces resource consumption and power waste.

Figure 9:
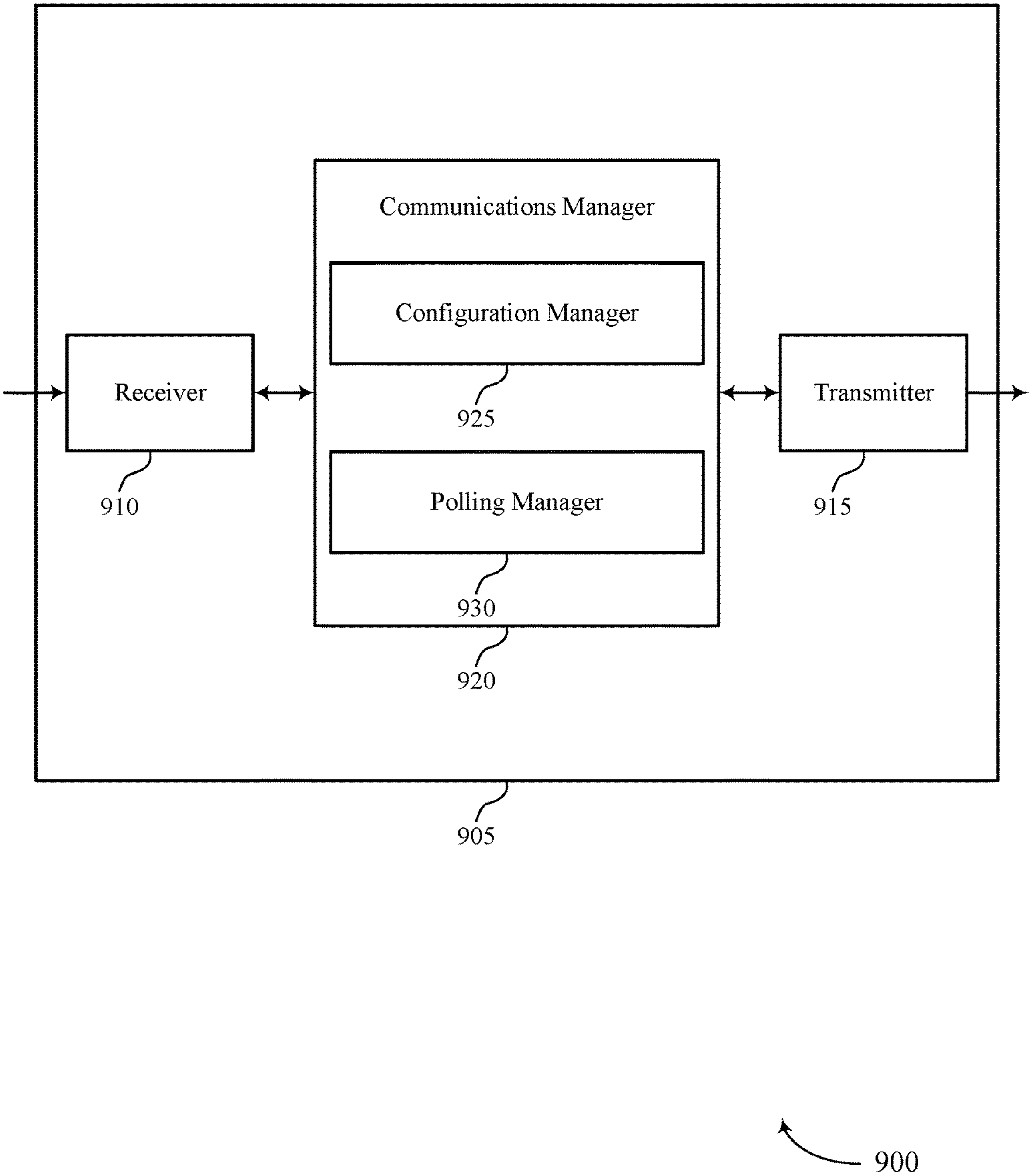

FIG. 9 shows a block diagram 900 of a device 905 that supports polling improvements for RLC in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, PDUs, SDUs) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, PDUs, SDUs) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of polling improvements for RLC as described herein. For example, the communications manager 920 may include a configuration manager 925 a polling manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The configuration manager 925 is capable of, configured to, or operable to support a means for outputting a configuration message indicating a threshold time duration event associated with transmission of a polling message for requesting a status PDU, the threshold time duration event corresponding to a time period following transmission of a data message without reception of the status PDU. The polling manager 930 is capable of, configured to, or operable to support a means for obtaining a first polling message that requests a first status PDU including feedback for a first data message based on a time duration satisfying the threshold time duration event, the first polling message indicating that the time duration has elapsed since communication of the first data message without reception of the first status PDU.

Figure 10:
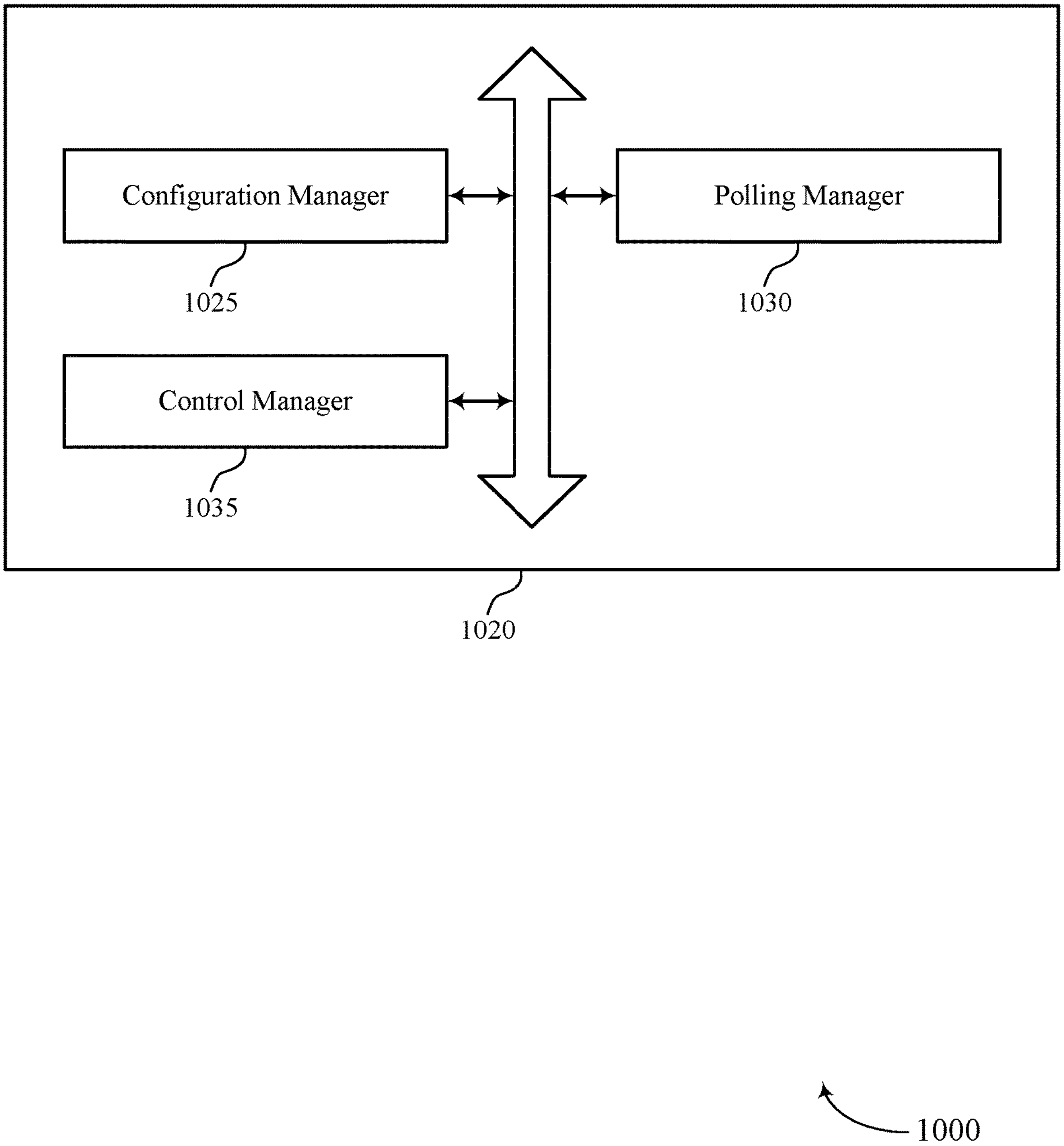
FIG. 10 shows a block diagram of a communications manager that supports polling improvements for RLC in accordance with one or more aspects of the present disclosure.

FIG. 10 shows a block diagram 1000 of a communications manager 1020 that supports polling improvements for RLC in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of polling improvements for RLC as described herein. For example, the communications manager 1020 may include a configuration manager 1025, a polling manager 1030, a control manager 1035, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The configuration manager 1025 is capable of, configured to, or operable to support a means for outputting a configuration message indicating a threshold time duration event associated with transmission of a polling message for requesting a status PDU, the threshold time duration event corresponding to a time period following transmission of a data message without reception of the status PDU. The polling manager 1030 is capable of, configured to, or operable to support a means for obtaining a first polling message that requests a first status PDU including feedback for a first data message based on a time duration satisfying the threshold time duration event, the first polling message indicating that the time duration has elapsed since communication of the first data message without reception of the first status PDU.

In some examples, the threshold time duration event is associated with a packet delay budget for the first data message.

In some examples, the threshold time duration event is associated with a quality of service flow, a PDU set, a packet priority, or any combination thereof.

In some examples, to support obtaining the first polling message, the control manager 1035 is capable of, configured to, or operable to support a means for obtaining the first polling message indicating one or more SNs associated with one or more data messages including the first data message, the first polling message indicating that a respective delay associated with a respective status PDU for the one or more data messages satisfies the threshold time duration event.

In some examples, to support obtaining the first polling message, the control manager 1035 is capable of, configured to, or operable to support a means for obtaining the first polling message indicating a range of data messages or a quantity of data messages, where a respective delay associated with a respective status PDU for the range of data messages or the quantity of data messages satisfies the threshold time duration event.

In some examples, to support obtaining the first polling message, the polling manager 1030 is capable of, configured to, or operable to support a means for obtaining a DRS MAC-CE.

In some examples, the configuration message is an RRC message.

Figure 11:
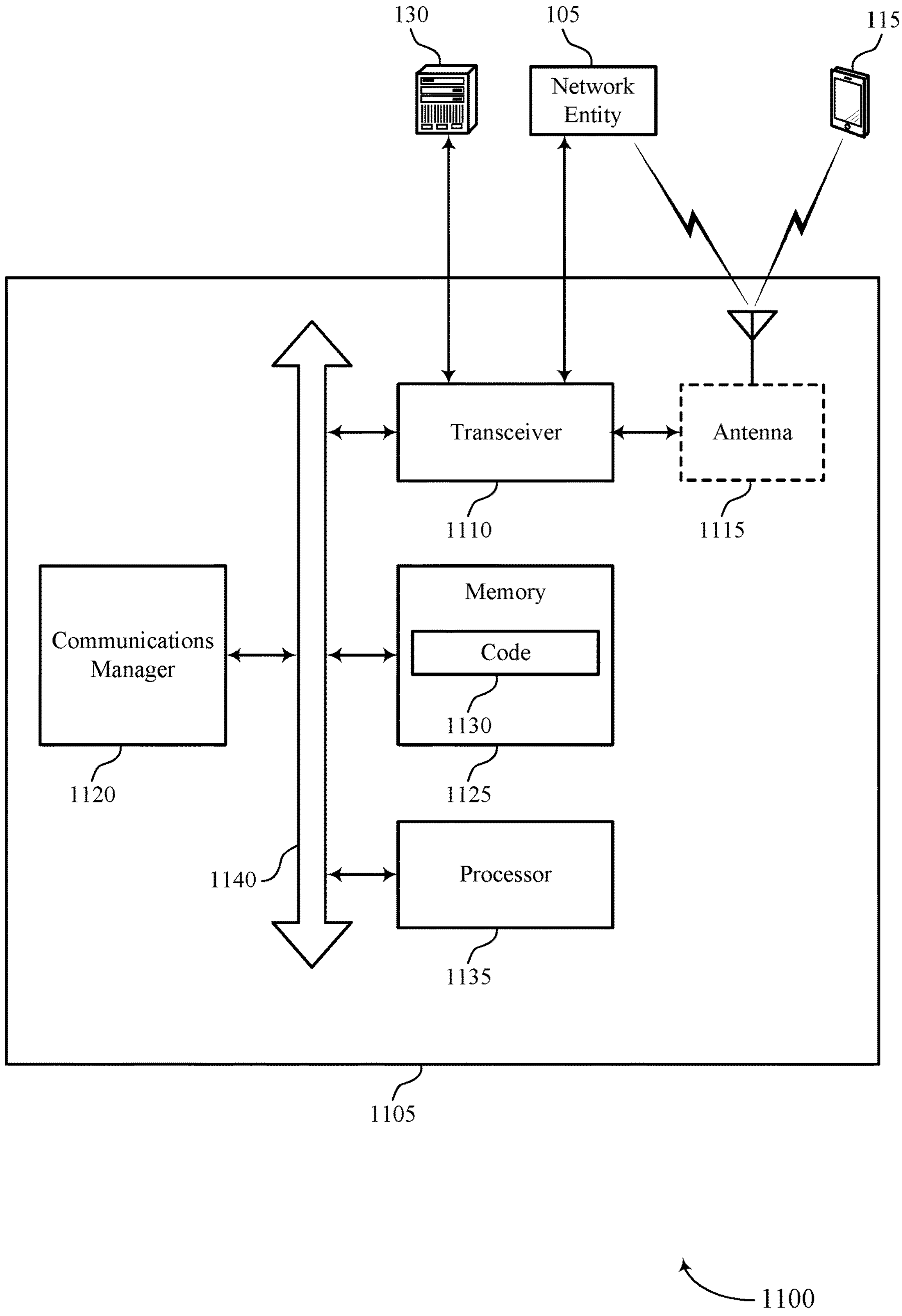
FIG. 11 shows a diagram of a system including a device that supports polling improvements for RLC in accordance with one or more aspects of the present disclosure.

FIG. 11 shows a diagram of a system 1100 including a device 1105 that supports polling improvements for RLC in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting polling improvements for RLC). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network devices 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for outputting a configuration message indicating a threshold time duration event associated with transmission of a polling message for requesting a status PDU, the threshold time duration event corresponding to a time period following transmission of a data message without reception of the status PDU. The communications manager 1120 is capable of, configured to, or operable to support a means for obtaining a first polling message that requests a first status PDU including feedback for a first data message based on a time duration satisfying the threshold time duration event, the first polling message indicating that the time duration has elapsed since communication of the first data message without reception of the first status PDU.

By including or configuring the communications manager 1120 in accordance with examples as described herein, the device 1105 may support techniques for reduced latency and improved user experience by reducing latencies caused by the UE waiting to retransmit messages due to a lack of feedback from the network entity.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of polling improvements for RLC as described herein, or the at least one processor 1135 and the at least one memory 1125 may be otherwise configured to, individually or collectively, perform or support such operations.

Figure 12:
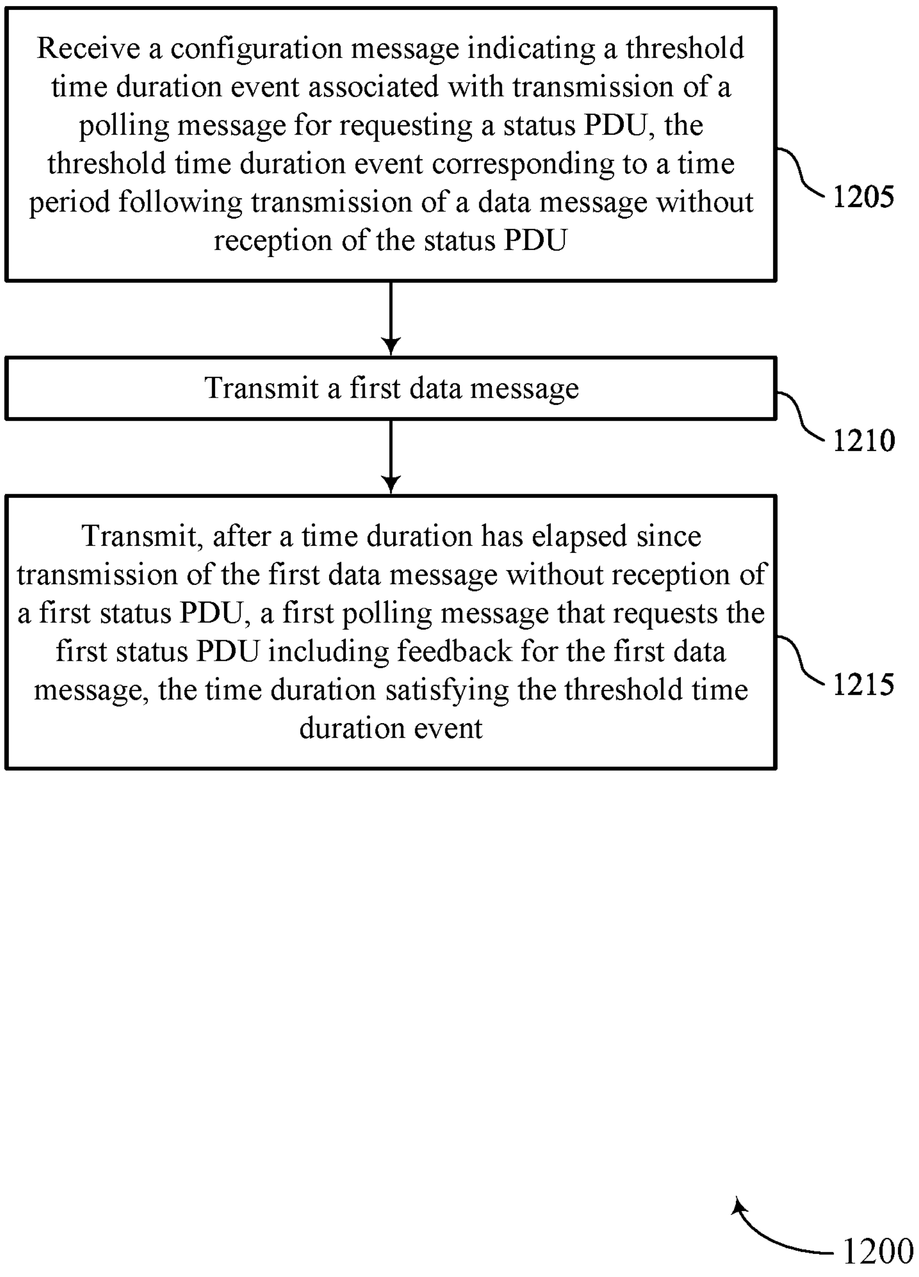

FIG. 12 shows a flowchart illustrating a method 1200 that supports polling improvements for RLC in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a configuration message indicating a threshold time duration event associated with transmission of a polling message for requesting a status PDU, the threshold time duration event corresponding to a time period following transmission of a data message without reception of the status PDU. The operations of 1205 may be performed in accordance with examples as disclosed herein. In some examples, aspects of the operations of 1205 may be performed by a configuration component 625 as described with reference to FIG. 6.

At 1210, the method may include transmitting a first data message. The operations of 1210 may be performed in accordance with examples as disclosed herein. In some examples, aspects of the operations of 1210 may be performed by a data message component 630 as described with reference to FIG. 6.

At 1215, the method may include transmitting, after a time duration has elapsed since transmission of the first data message without reception of a first status PDU, a first polling message that requests the first status PDU including feedback for the first data message, the time duration satisfying the threshold time duration event. The operations of 1215 may be performed in accordance with examples as disclosed herein. In some examples, aspects of the operations of 1215 may be performed by a polling component 635 as described with reference to FIG. 6.

FIG. 13 shows a flowchart illustrating a method 1300 that supports polling improvements for RLC in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include outputting a configuration message indicating a threshold time duration event associated with transmission of a polling message for requesting a status PDU, the threshold time duration event corresponding to a time period following transmission of a data message without reception of the status PDU. The operations of 1305 may be performed in accordance with examples as disclosed herein. In some examples, aspects of the operations of 1305 may be performed by a configuration manager 1025 as described with reference to FIG. 10.

At 1310, the method may include obtaining a first polling message that requests a first status PDU including feedback for a first data message based on a time duration satisfying the threshold time duration event, the first polling message indicating that the time duration has elapsed since communication of the first data message without reception of the first status PDU. The operations of 1310 may be performed in accordance with examples as disclosed herein. In some examples, aspects of the operations of 1310 may be performed by a polling manager 1030 as described with reference to FIG. 10.

The following provides an overview of aspects of the present disclosure:

Aspect 1: A method for wireless communications by a UE, comprising: receiving a configuration message indicating a threshold time duration event associated with transmission of a polling message for requesting a status PDU, the threshold time duration event corresponding to a time period following transmission of a data message without reception of the status PDU; transmitting a first data message; and transmitting, after a time duration has elapsed since transmission of the first data message without reception of a first status PDU, a first polling message that requests the first status PDU comprising feedback for the first data message, the time duration satisfying the threshold time duration event.

Aspect 2: The method of aspect 1, wherein transmitting the first polling message further comprises: transmitting the first polling message based at least in part on a value of a timer satisfying the threshold time duration event, the timer being initiated based least in part on transmission of the first data message.

Aspect 3: The method of any of aspects 1 through 2, further comprising: receiving a feedback message comprising first feedback for the first data message, wherein a timer is released based at least in part on reception of the feedback message; and transmitting a first retransmission of the first data message, wherein the timer is reset and restarted based at least in part on transmission of the first retransmission.

Aspect 4: The method of any of aspects 1 through 3, wherein the time duration is based at least in part on an amount of time that has elapsed since arrival of the first data message at a PDCP layer of the UE without reception of an acknowledgement for the first data message.

Aspect 5: The method of any of aspects 1 through 4, wherein the threshold time duration event is associated with a packet delay budget for the first data message.

Aspect 6: The method of any of aspects 1 through 5, wherein the threshold time duration event is associated with a quality of service flow, a PDU set, a packet priority, or any combination thereof.

Aspect 7: The method of any of aspects 1 through 6, wherein transmitting the first polling message further comprises: transmitting the first polling message indicating one or more SNs associated with one or more data messages including the first data message, the control message indicating that a respective delay associated with reception of a respective status PDU for the one or more data messages satisfies the threshold time duration event.

Aspect 8: The method of any of aspects 1 through 7, wherein transmitting the first polling message further comprises: transmitting the first polling message indicating a range of data messages or a quantity of data messages, wherein a respective delay associated with reception of a respective status PDU for the range of data messages or the quantity of data messages satisfies the threshold time duration event.

Aspect 9: The method of any of aspects 1 through 8, wherein transmitting the first polling message comprises: transmitting a DSR MAC-CE.

Aspect 10: The method of any of aspects 1 through 9, wherein the configuration message is an RRC message.

Aspect 11: A method for wireless communications by a network entity, comprising: outputting a configuration message indicating a threshold time duration event associated with transmission of a polling message for requesting a status PDU, the threshold time duration event corresponding to a time period following transmission of a data message without reception of the status PDU; and obtaining a first polling message that requests a first status PDU comprising feedback for a first data message based at least in part on a time duration satisfying the threshold time duration event, the first polling message indicating that the time duration has elapsed since communication of the first data message without reception of the first status PDU.

Aspect 12: The method of aspect 11, wherein the threshold time duration event is associated with a packet delay budget for the first data message.

Aspect 13: The method of any of aspects 11 through 12, wherein the threshold time duration event is associated with a quality of service flow, a PDU set, a packet priority, or any combination thereof.

Aspect 14: The method of any of aspects 11 through 13, wherein obtaining the first polling message comprises: obtaining the first polling message indicating one or more SNs associated with one or more data messages including the first data message, the control message indicating that a respective delay associated with a respective status PDU for the one or more data messages satisfies the threshold time duration event.

Aspect 15: The method of any of aspects 11 through 14, wherein obtaining the first polling message comprises: obtaining the first polling message indicating a range of data messages or a quantity of data messages, wherein a respective delay associated with a respective status PDU for the range of data messages or the quantity of data messages satisfies the threshold time duration event.

Aspect 16: The method of any of aspects 11 through 15, wherein obtaining the first polling message comprises: obtaining a DSR MAC-CE.

Aspect 17: The method of any of aspects 11 through 16, wherein the configuration message is an RRC message.

Aspect 18: A UE for wireless communications, comprising one or more memories storing processor-executable code, and one or more processors coupled with the one or more memories and individually or collectively operable to execute the code to cause the UE to perform a method of any of aspects 1 through 10.

Aspect 19: A UE for wireless communications, comprising at least one means for performing a method of any of aspects 1 through 10.

Aspect 20: A non-transitory computer-readable medium storing code for wireless communications, the code comprising instructions executable by one or more processors to perform a method of any of aspects 1 through 10.

Aspect 21: A network entity for wireless communications, comprising one or more memories storing processor-executable code, and one or more processors coupled with the one or more memories and individually or collectively operable to execute the code to cause the network entity to perform a method of any of aspects 11 through 17.

Aspect 22: A network entity for wireless communications, comprising at least one means for performing a method of any of aspects 11 through 17.

Aspect 23: A non-transitory computer-readable medium storing code for wireless communications, the code comprising instructions executable by one or more processors to perform a method of any of aspects 11 through 17.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a configuration message indicating a threshold time duration event associated with transmission of a polling message for requesting a status protocol data unit, the threshold time duration event corresponding to a time period following transmission of a data message without reception of the status protocol data unit;

transmit a first data message; and transmit, after a time duration has elapsed since transmission of the first data message without reception of a first status protocol data unit, a first polling message that indicates a remaining time corresponding to the threshold time duration event and that requests the first status protocol data unit comprising feedback for the first data message, wherein the time duration is based at least in part on an amount of time that has elapsed since arrival of the first data message at a packet data convergence protocol layer of the UE without reception of an acknowledgement for the first data message.

2. The UE of claim 1, wherein, to transmit the first polling message, the one or more processors are individually or collectively further operable to execute the code to cause the UE to:

transmit the first polling message based at least in part on a value of a timer satisfying the threshold time duration event, the timer being initiated based least in part on transmission of the first data message.

3. The UE of claim 1, wherein the one or more processors are individually or collectively further operable to execute the code to cause the UE to:

receive a feedback message comprising first feedback for the first data message, wherein a timer is released based at least in part on reception of the feedback message; and transmit a first retransmission of the first data message, wherein the timer is reset and restarted based at least in part on transmission of the first retransmission.

4. The UE of claim 1, wherein the threshold time duration event is associated with a packet delay budget for the first data message.

5. The UE of claim 1, wherein the threshold time duration event is associated with a quality of service flow, a protocol data unit set, a packet priority, or any combination thereof.

6. The UE of claim 1, wherein, to transmit the first polling message, the one or more processors are individually or collectively further operable to execute the code to cause the UE to:

transmit the first polling message indicating one or more sequence numbers associated with one or more data messages including the first data message, the first polling message indicating that a respective delay associated with reception of a respective status protocol data unit for the one or more data messages satisfies the threshold time duration event.

7. The UE of claim 1, wherein, to transmit the first polling message, the one or more processors are individually or collectively further operable to execute the code to cause the UE to:

transmit the first polling message indicating a range of data messages or a quantity of data messages, wherein a respective delay associated with reception of a respective status protocol data unit for the range of data messages or the quantity of data messages satisfies the threshold time duration event.

8. The UE of claim 1, wherein, to transmit the first polling message, the one or more processors are individually or collectively operable to execute the code to cause the UE to:

transmit a dynamic scheduling request (DSR) medium access control-control element (MAC-CE).

9. The UE of claim 1, wherein the configuration message is a radio resource control (RRC) message.

10. A network entity, comprising:

one or more memories storing processor-executable code; and one or more processors coupled with the one or more memories and individually or collectively operable to execute the code to cause the network entity to:

output a configuration message indicating a threshold time duration event associated with transmission of a polling message for requesting a status protocol data unit, the threshold time duration event corresponding to a time period following transmission of a data message without reception of the status protocol data unit, wherein the time period is based at least in part on an amount of time that has elapsed since arrival of the data message at a packet data convergence protocol layer without reception of an acknowledgement for the data message; and obtain a first polling message that indicates a remaining time corresponding to the threshold time duration event and that requests a first status protocol data unit comprising feedback for a first data message.

11. The network entity of claim 10, wherein the threshold time duration event is associated with a packet delay budget for the first data message.

12. The network entity of claim 10, wherein the threshold time duration event is associated with a quality of service flow, a protocol data unit set, a packet priority, or any combination thereof.

13. The network entity of claim 10, wherein, to obtain the first polling message, the one or more processors are individually or collectively further operable to execute the code to cause the network entity to:

obtain the first polling message indicating one or more sequence numbers associated with one or more data messages including the first data message, the first polling message indicating that a respective delay associated with a respective status protocol data unit for the one or more data messages satisfies the threshold time duration event.

14. The network entity of claim 10, wherein, to obtain the first polling message, the one or more processors are individually or collectively further operable to execute the code to cause the network entity to:

obtain the first polling message indicating a range of data messages or a quantity of data messages, wherein a respective delay associated with a respective status protocol data unit for the range of data messages or the quantity of data messages satisfies the threshold time duration event.

15. The network entity of claim 10, wherein, to obtain the first polling message, the one or more processors are individually or collectively operable to execute the code to cause the network entity to:

obtain a dynamic scheduling request (DSR) medium access control-control element (MAC-CE).

16. The network entity of claim 10, wherein the configuration message is a radio resource control (RRC) message.

17. A method for wireless communications by a user equipment (UE), comprising:

receiving a configuration message indicating a threshold time duration event associated with transmission of a polling message for requesting a status protocol data unit, the threshold time duration event corresponding to a time period following transmission of a data message without reception of the status protocol data unit;

transmitting a first data message; and transmitting, after a time duration has elapsed since transmission of the first data message without reception of a first status protocol data unit, a first polling message that indicates a remaining time corresponding to the threshold time duration event and that requests the first status protocol data unit comprising feedback for the first data message, wherein the time duration is based at least in part on an amount of time that has elapsed since arrival of the first data message at a packet data convergence protocol layer of the UE without reception of an acknowledgement for the first data message.

18. The method of claim 17, wherein transmitting the first polling message further comprises:

transmitting the first polling message based at least in part on a value of a timer satisfying the threshold time duration event, the timer being initiated based least in part on transmission of the first data message.

19. The method of claim 17, further comprising:

receiving a feedback message comprising first feedback for the first data message, wherein a timer is released based at least in part on reception of the feedback message; and transmitting a first retransmission of the first data message, wherein the timer is reset and restarted based at least in part on transmission of the first retransmission.

* * * * *